United States Patent [19]

Ryan et al.

[11] 4,395,906

[45] Aug. 2, 1983

[54] STORM MAPPING SYSTEM

[75] Inventors: Paul A. Ryan; Kenneth A. Ostrander; David L. West, all of Columbus, Ohio

[73] Assignee: Minnesota Mining and Manufacturing Co., St. Paul, Minn.

[21] Appl. No.: 225,814

[22] Filed: Jan. 16, 1981

[51] Int. Cl.$^3$ .............................................. G01W 1/08
[52] U.S. Cl. ...................................... 73/170 R; 324/72
[58] Field of Search .................. 73/170 R; 324/72; 340/752, 755, 782, 601

[56] References Cited

U.S. PATENT DOCUMENTS

| | | | |
|---|---|---|---|
| 3,715,660 | 2/1973 | Ruhnke | 73/170 R |
| 4,023,408 | 5/1977 | Ryan | 73/170 R |
| 4,115,732 | 9/1978 | Krider | 324/72 |
| 4,198,599 | 4/1980 | Krider | 324/72 |

Primary Examiner—E. R. Kazenske
Assistant Examiner—Denis E. Corr
Attorney, Agent, or Firm—Pollock, Vande Sande & Priddy

[57] ABSTRACT

A storm mapping system detects electrical activity caused by weather phenomona such as lightning strokes, and the like and displays information related to the electrical activity indicative of storm location in a frame of reference in which the observation location is taken as the origin. In order to give the observer good spatial understanding, signals detected from a relatively close disturbance (which produces relatively large signals) are displayed relatively close to the observation location as compared to display of signals generated from a relatively further disturbance which produces relatively smaller signals which are displayed relatively far from the observation location. The limited resolution display is effectively driven by signals read from digital storage wherein mapping between the different display segments and digital storage is maintained. The display indicates, in addition to location, intensity of the disturbance by providing a steady illumination for disturbances of relatively low intensity, a slowly flashing display for disturbances of increased intensity, and a quickly flashing display for disturbances of highest intensity. Intensity information is built up as a function of time over which signals may be received related to a particular display segment. In order to maintain the integrity of the data, all locations have the data reduced at a rate related to the intensity stored data.

13 Claims, 16 Drawing Figures

FIG. 2A

FIG.2B TIMER 70

FIG.6F
INTERRUPT HANDLER (CON'T)

FIG. 6G

FIG. 6H
SWEEP

STORM MAPPING SYSTEM

FIELD OF THE INVENTION

The invention relates to storm mapping systems; one particular application finds effective use in aircraft.

BACKGROUND OF THE INVENTION

The present invention is an improvement in the storm mapping system disclosed in U.S. Pat. No. 4,023,408, the disclosure of which is incorporated herein by reference.

In the referred to patent, several significant advances in the field of storm mapping and the display of storm information were disclosed. While the device described in the referenced patent has met a significant commercial need, it has been discovered that at least a segment of those with a need for storm mapping do not need the high resolution capability offered by the device described therein. Thus, in order to benefit that specific segment of the public it was found desirable to provide a device with capabilities very similar to that described in the referenced patent, with the exception that display resolution is somewhat more limited than that in the described device. One advantage of offering reduced resolution is a significant reduction in complexity, and hence cost.

The device described in the referenced patent offers a theoretically infinite number of display locations distributed 360° in azimuth about the origin or observation location and extending out to the full range (100-200 nautical miles) of the instrument. In contrast, the improved storm mapping device of this invention displays ±60° in azimuth, in 15° increments and divides the 100 nautical mile range into three increments, for a total of 27 display segments; nine azimuth segments for each of three different ranges, 0-30 miles, 30-60 miles, and 60-100 miles. A particular advantage of reducing the resolution is that rather than organizing the memory to store data representing each different electrical disturbance, and storing data defining the coordinates of the disturbance, as in the referenced patent, the storage system of the present invention need only provide a storage register or memory location for each of the different display segments.

The device described in the referenced patent provided storm intensity information by displaying a plurality of received signals closely spaced together. In accordance with the present invention each of the 27 different display segments assumes one of four states; dark, indicating no activity; steadily illuminated, indicating relatively low activity or low intensity; slowly flashing, indicating increased intensity or activity; and rapidly flashing indicating relatively high intensity or activity. In order to effect this on the display, each display segment corresponds to a different storage register or location in a digital memory. Each time a received signal is detected corresponding to a particular display segment, and thus to a particular storage location or register, the data in the register is incremented by a determined quantity. Although the determined quantity by which each storage register is incremented could be equal, in accordance with a further feature of the invention the closer is the display segment to the origin, the greater is the amount by which the data is incremented. Intensity is determined by the quantity in the storage register or location at any time, and in order to maintain a correlation between this quantity and actual electrical activity, the storage registers are continually decremented. While the data in the storage register could be decremented at a constant rate, in accordance with a further feature of the invention, the storage registers are decremented in sequence, but the amount by which they are decremented depends upon the pre-existing quantity in the storage location.

Accordingly, the display process is relatively simple, it only requires, for each storage location determining the data stored therein and controlling the associated display element to either be unilluminated, steadily illuminated, slowly flashing or rapidly flashing.

The analog processing of received signals is similar to that described in the referred to patent. More particularly, three tuned receivers are provided, one omnidirectional receiver for sensing electric field (sometimes referred to as the sense channel) and two orthogonal magnetic field receivers. The three receivers or channels are tuned in common to approximately 50 KHz. The signals in the sense and magnetic field channels are amplified, and then the signal in the sense channel is correlated with the signals in the two magnetic field channels to produce two correlated signal channels.

The two correlated signals are summed as vectors and if the resulting sum exceeds a threshold a timer is initiated, the timer generating a plurality of control signals at specified delays for purposes which will be described hereinafter.

One use of the control signals produced by the timer is for the synchronous detection or correlation of the signals. A second use of the control signals is to control an integration process on the correlated signals. The integrated correlated signals are summed to provide a range approximation signal.

A plurality of comparators are provided with this range approximation signal and the output of the comparators comprise a digital range approximation signal. The analog to digital conversion is arranged to perform the foldback process described in the referred to patent. More particularly, the analog to digital conversion of the range approximation signal produces a two bit range representative digital signal as well as an inhibit signal if the detected range is outside the range of the instrument (either less than 5 miles or greater than 100 miles). Significantly, in connection with the foldback process, the relatively large range approximation signals produce the relatively smaller digital representations. For example, the largest range approximation signal output (within the range of the instrument) produces the two bit digital signal—"00" whereas the smallest range approximation within the range of the instrument produces a two bit digital signal "11".

At the same time, the outputs of the two magnetic channels comprising the correlated integrated signals are provided to a second set of comparators for an analog to digital conversion of azimuth representing signals. The second set of comparators produces a four bit digital signal defining azimuth as within one of nine segments as well as contributing to the generation of the inhibit signal if the azimuth is detected as being outside the range of the instrument.

Once the seven bits of azimuth and range information, as well as an eighth inhibit bit is available, another one of the control signals from the timer is used to initiate the logic circuit, including a storage section or memory. In one embodiment of the invention which has been constructed, the logic circuit is implemented as a conventional microprocessor, for example, INTEL 8748. The seven data bits generated by the instrument are used to address the memory so as to locate a storage location in the microprocessor corresponding to the region in which the electrical disturbance resulting in the received signals is located. This storage location has stored therein data representing the electrical activity and the particular received signal is now employed to modify the data stored at that location. While that modification could be simply incrementing a quantity stored there, in a preferred form of the invention the amount by which the previously stored data is incremented depends upon the particular location being addressed. Thus, those locations closest to the origin are incremented by more than other locations which may be further from the origin. For example, the range locations furthest from the origin may be incremented by a given amount each time a signal is detected as originating in that range segment. The next closer range segment is incremented by twice that quantity each time a signal is detected as originating in that range. Still a closer range segment is incremented by double the previous amount. And finally, signals representing closest activity to the origin are incremented by still double that amount.

Since intensity is a time dependent parameter, each of the storage locations is also continually being decremented so that a display is not saturated by "old" intensity information. Rather than decrementing each storage location at a constant rate, each storage location is operated on sequentially but the quantity removed from that storage location is related to the pre-existing stored data. Thus, those locations which have indications of relatively intense activity are reduced by more, on each iteration, than other locations which represent less intense activity.

On a repetitive basis, as a result, the display apparatus comprising a display chip (HLCD0438P) is driven by the microprocessor, each display segment is driven depending on the stored quantity so that the display segment is either undisturbed, steadily illuminated, or flashed at a slow or rapid rate.

In summary then, the invention comprises a system for detecting and displaying relative locations of sources of electrical disturbances generated by weather phenomena with respect to an observation location comprising:

receiving means for receiving electrical signals generated by said electrical disturbances in a predetermined frequency band and for producing received signals related thereto, timing means responsive to said received signals for producing a plurality of control signals, processing means responsive to said received signals and to said control signals for producing processed signals relating said received signals in a frame of reference whereby relatively larger received signals are related closer to an origin of said frame of reference comprising said observation location than relatively smaller received signals, logic means, including storage means, reponsive to said control signals and said processed signals for storing data representing said processed signals at locations determined by said processed signals, and display means driven by said logic means for displaying said stored data representing relative locations of said electrical disturbances to said frame of reference.

BRIEF DESCRIPTION OF THE DRAWINGS

The present invention will now be described so as to enable those skilled in the art to make and use the same in the following portions of this specification when taken in conjunction with the attached drawings in which like reference characters identify identical apparatus and in which;

FIGS. 6A through 6H comprise flow charts for the software employed by processor 20, more particularly

DESCRIPTION OF PREFERRED EMBODIMENT

Figures 1A, 1B, 1C:
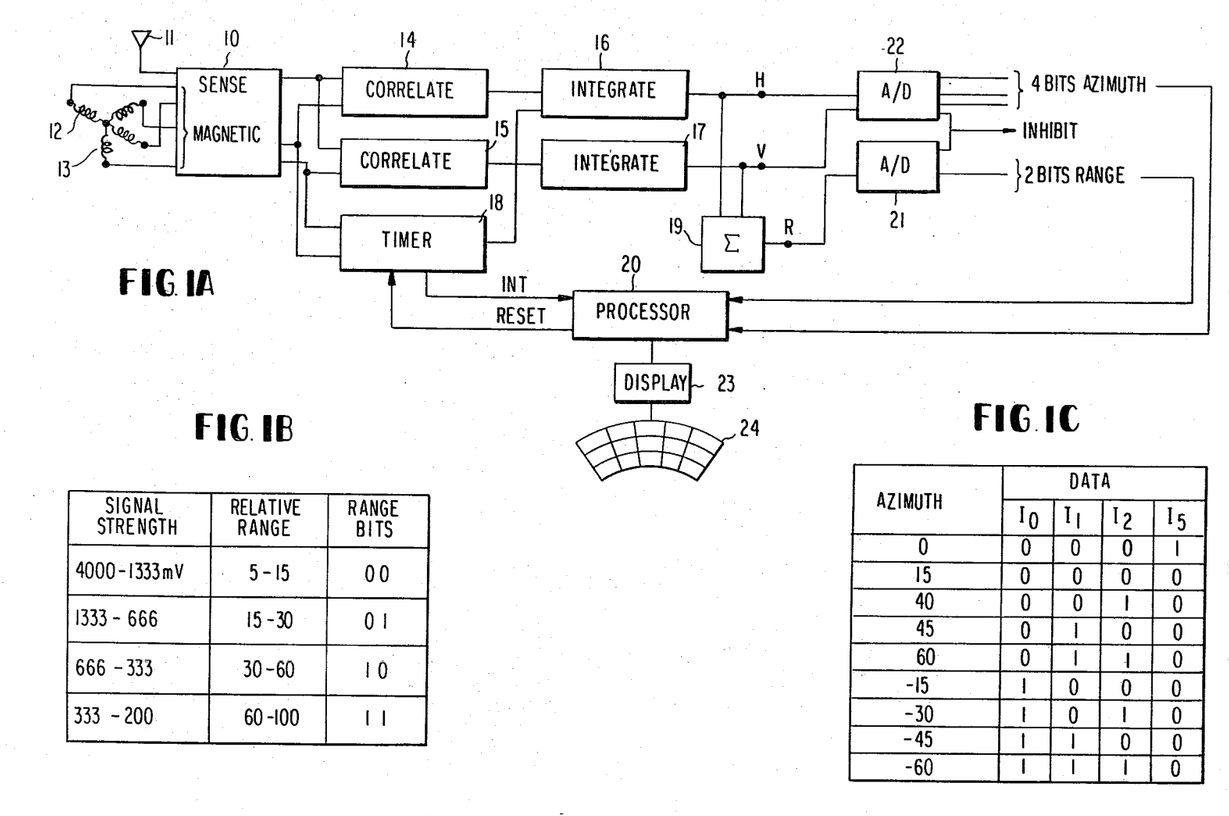
FIG. 1A is a block diagram of a system embodying the present invention.
FIGS. 1B and 1C relate received signal strength to range and azimuth.

As is shown in FIG. 1A the tuned receiver 10 of an embodiment of the invention includes a sense channel and two magnetic channels; each connected to an associated antenna 11-13; two magnetic antenna elements 12 and 13 comprising a cross-loop detector. The receiver 10 provides for frequency discrimination and amplification and is tuned in the vicinity of 50 KHz. The output of the receiver section 10 includes an output for the sense channel as well as an output for each of the magnetic channels.

In order to ensure appropriate signal detection, the invention utilizes the in-phase characteristic of the electric and magnetic components of the far field to perform a filtering function. To this end, a correlator or synchronous detector 14 and 15 is provided for each of the magnetic channels. One input to each of these correlators is the output of the associated magnetic channel, and the second input is the output of the sense channel. Each of the correlators 14 and 15 produces an output coupled to an associated integrator 16 and 17. As described in the referenced patent, far field components are related to the time derivative of the current waveform. Therefore, to get some measure of intensity, the far field signals must be integrated. However, in order to focus in on a particular strike, the integration process must be properly timed with reference to that strike. To this end, the receiver outputs corresponding to the two magnetic channels are also provided as an input to a timer 18. The timer 18 provides a threshold against which the received signals are compared; when that threshold is exceeded, the timer is initiated into operation to produce control signals for the control of the integration process as well as the use of the signals which result from the integration process. Thus, one output of timer 18 maintains the correlators reset so that the integrators have zero input, a different output of the timer allows the correlators to operate and as the correlators produce non-zero output, that output is integrated; finally, the timer has a third output to open the correlators to terminate the integration process but maintain the output of the integrators, this is also provided as an interrupt signal to processor 20, the functions of which will be explained hereinafter.

Accordingly, at the conclusion of the integration process, when the timer 18 provides the appropriate control signal, the output of the integrators 16 and 17 provide H and V signals which are orthogonal components related to the current waveform of the lightning strike itself, and accordingly from these signals a measure of strike intensity as well as direction can be determined.

The outputs from the integrators 16 and 17 are provided to a summing network 19. Theoretical considerations would lead one to believe that the orthogonal components describing the current waveform should be squared, the sum of the squares formed and the square root taken. However, experience has indicated that within the limited range of the system ($\pm 60°$ in azimuth and up to 100 nautical miles in range) in an embodiment of the invention which has been constructed, adequate results can be obtained by summing the V signal with $\frac{1}{2}$ the H signal. This sum is formed in the summing network 19, and the result R is provided to a first analog to digital converter 21. The analog to digital converter 21 performs the analog to digital conversion as well as the necessary foldback (more completely explained in the referenced patent). Simply, the larger received signals relate to current waveforms which are relatively closer to the instrument than smaller received signals. It is desirable, as is more completely explained in the referenced patent, to maintain this spatial information in the display, and accordingly, larger received signals must be displayed closer to the origin than smaller received signals. To effect this, in addition to analog to digital conversion, the logic is arranged so that the largest received signals produces a digital representation of smallest magnitude, and the smallest received signal, within the range of the instrument, produces a digital signal of the largest magnitude. In an embodiment which has been constructed, the range of the instrument (5 to 100 nautical miles) has been divided into four range segments, 6-15 miles, 15-30 miles, 30-60 miles, and 60-100 miles; accordingly, two digital bits are sufficient to designate any range segment. Thus, as shown in FIG. 1B, the two-bit digital output of analog to digital converter 21 representing range is inversely related to signal strength. At the appropriate time, the output of the first analog to digital converter 21 is provided to the processor 20. In a similar fashion, the outputs of the integrators 16 and 17 are provided to a second analog to digital converter 22 to provide an azimuth representation. Since the instrument is designed to display weather disturbances $\pm 60°$ in azimuth, in nine azimuth sectors, four bits are sufficient to describe any azimuth sector, and the four bits used are related to the azimuth sector as shown in the Table which is FIG. 1C. Accordingly, the four bit output of the second analog-to-digital converter is also provided to the processor 20.

When the processor has accepted the information from the analog-to-digital converters 21 and 22 it provides a reset signal to the timer 18 to reset the analog circuitry to be in appropriate condition to receive information from further electrical disturbances.

Because of the relatively unlimited resolution in the device described in the above-referenced patent, the digital storage of that system is arranged to store information from each stroke separately. Thus for example, depending upon specific electrical disturbances to which the instrument responded, all could be relatively close together and nevertheless entirely fill the storage or memory. Another consequence of the data storage philosophy meant that the quantum of information retained was predetermined in that the instrument could store information from as many strokes as there were storage locations; once that number was exceeded, the next received signal would be stored to replace information from the oldest stored stroke. The storage arrangement in the system of the present invention is entirely different. A storage location is maintained for each different range and azimuth sector which is to be displayed. For example, with nine azimuth sectors and four range cells per sector, 36 storage locations are required. However, experience determines that it may not be necessary to separately display the 5-15 mile range cell and the 15-30 mile range cell. Accordingly, for display purposes we display nine azimuth sectors, and three range cells for each sector, thus a total of 27 display segments comprise the display. The closest and next closest range segments, in each azimuth sector, are summed for display purposes. Otherwise storage locations and display segments map on a one-for-one basis. Of course, the number of display segments could equal the number of memory locations, if desired.

In the referred to patent, since information relating to each stroke was separately stored, the information that was actually stored comprised information identifying the location of the stroke. On the other hand, in accordance with the present invention, since the storage location at which information is to be stored itself identifies the location of the stroke, it is not at all necessary to actually store that information; rather, the signals developed by the instrument are used for addressing purposes. However, in order to maintain information respecting the intensity or activity of disturbances associated with the storage location the processor alters the contents of the storage location each time it is addressed by the outputs of the analog-to-digital converters 21,22. Each time a storage location is addressed in response to detection of a disturbance in the associated region, a predetermined quantity is summed with the pre-existing data in that storage location. Since it is desirable for the display to provide information as to average activity in each segment, and since segments at increasing range correspond to larger areas, we compensate for this effect by using a different quantity in the summing process for the different range segments. In the embodiment described herein the quantities in adjacent range segments bear a 1:2 relationship, specifically 32, 16, 8 and 4 for "too close", "close", and "mid-range" and "far", respectively. That is each time activity is detected the associated quantity is summed with the prior contents of the corresponding memory location.

Since the storage is otherwise permanent, and since what the observer wants is a display to emphasize the most recent information, each of the cells is decremented sequentially. However, the quantity actually removed from the data in each cell depends upon the contents of that cell so that as a function of time the contents of a cell which is not incremented, logarithmically approaches zero. In order to actually employ the quantities in this range cell to give the observer this information, the display element 23 is loaded periodically by the processor 20 to either illuminate a display segment or not illuminate the segment. The display element 23 thereafter, drives the display 24 itself. The display 24 is, in an embodiment of the invention which has actually been constructed, an LCD array arranged as a 120° sector of a circle with twenty-seven elements, nine in each of three range segments, the display element 23 controls each of the 27 elements depending upon the data passed to it by the processor 20. If, for example, the associated storage location in the processor 20 indicates that a particular range cell had no activity, then the processor controls the display 24 to maintain that element unilluminated. On the other hand, if the information indicates relatively low activity for that range cell, then the processor controls the corresponding display element to be steadily illuminated. Increased activity results in slow flashing of the element and higher activity produces relatively faster flashing of the element. Thus, the observer, by noting whether the element is illuminated or not, and/or flashing can quickly tell the intensity of electrical disturbances in the corresponding region. The location of the display element relative to the origin indicates the particular region from which the information was derived.

Figure 2A:
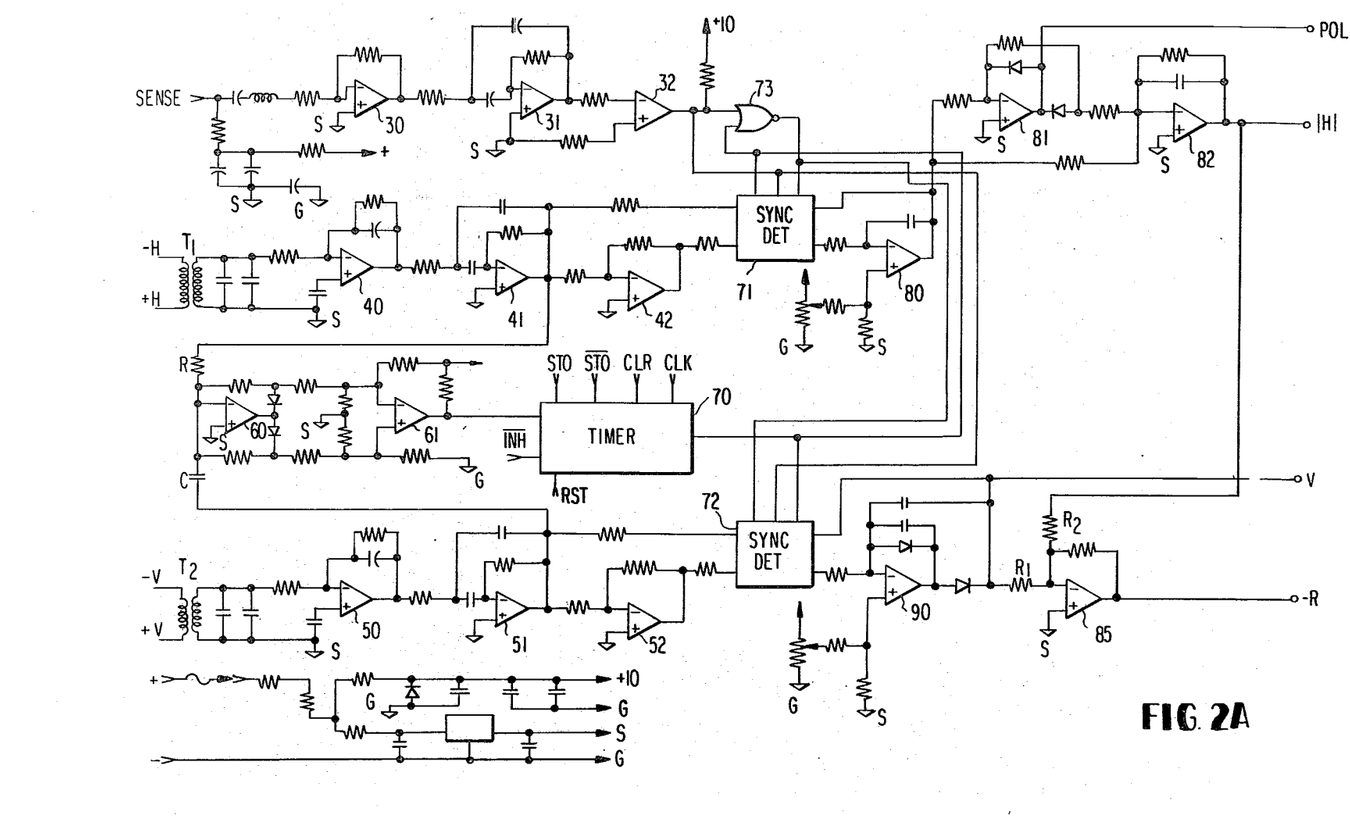
FIG. 2A is a schematic of the analog portion of the block diagram of FIG. 1A.

Referring now to FIG. 2A, the receiver 10, correlator 14, integrator 16, timer 18 and summing network 19 are illustrated.

As shown in FIG. 2A, the sense antenna is coupled to the sense channel comprising tuned operational amplifiers 30, 31 and 32. Likewise, one of the crossfield magnetic coils is coupled to the H channel through a transformer $T_1$; the channel includes three tuned operational amplifiers 40, 41 and 42.

The other magnetic channel detector is coupled to the V channel through transformer $T_2$; the V channel comprising tuned operational amplifiers 50, 51 and 52. Outputs from the H and V channels is appropriately phased for vector summation by resistor R and capacitor C. The output of the operational amplifier 61 (comprising a comparator) provides the control input to the timer 70. Timer 70, on receipt of an input in excess of the threshold established at 61 provides a control signal of 80 microsecond time interval during which the signals in the H and V channels are correlated with the sense channel and integrated, as will now be explained. At the conclusion of the 80 microsecond period, the timer 70 provides the signal STO, which is used as an interrupt to the processor 20. When the processor 20 completes its operation a reset (RST) signal is provided to the timer 70.

Figure 2B:
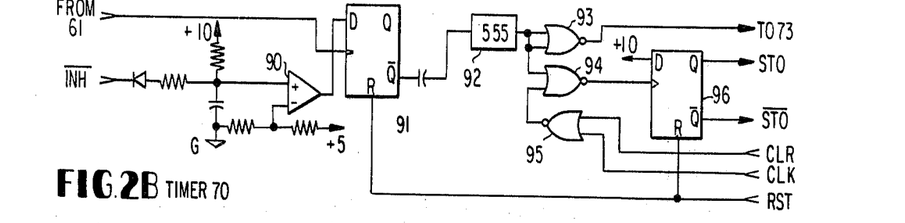
FIG. 2B is a schematic of the timer 70 (of FIG. 2A)

FIG. 2B illustrates the timer 70 which more particularly comprises flip-flops 91 ad 96, the output from amplifier 61 providing the clocking input to flip-flop 91. A further operational amplifier 90 has one input coupled to an inhibit output which is used to inhibit operation during use of a co-located radio transmitter. When the inhibit signal is active, the output of the amplifier 90 prevents the flip-flop from becoming set which inhibits the production of any further timing signals. The $\overline{Q}$ output of flip-flop 91 provides an input to the 555 timing circuit 92, the output of which is coupled as the inputs to NOR gate 93, and one of the inputs to NOR gate 94. Two signals provided by the processor 20, CLR and CLK provide the inputs to NOR gate 95, the output of which provides the other input to NOR gate 94. The output of NOR gate 94 is the clocking input to the second flip-flop 96, whose D input is coupled to a potential source. The Q and $\overline{Q}$ outputs of flip-flop 96 provide the signals STO and $\overline{STO}$. Finally, the output of the NOR gate 93 is the input to the NOR gate 73 (of FIG. 2A). The input from the processor RST (reset) provides the resetting inputs to flip-flops 91 and 96.

In operation the $\overline{Q}$ output of flip-flop 91 initiates monostable 92 resulting in an 80 microsecond pulse from gate 93. At the conclusion of this period flip-flop 96 is set to produce the signal STO which is used to interrupt the processor, as will be explained, and to freeze the correlation process which has the effect of holding the integrator output. The reset signal (from the processor) reinitializes the timer 70 and zeros the integrators.

The correlation function employs a pair of synchronous detectors 71 and 72, one for each of the H and V channels implemented as a dual four channel analog switch carrying the commercial designation 4052. Each synchronous detector receives, as one input the output of the associated H or V channel. Another input to each of the synchronous detectors is the output of the operational amplifier 32 comprising the sense channel signal. In addition, a control signal from the timer 70 is also provided as an input to the synchronous detector 71 and 72. NOR gate 73 logically ANDs the output of the sense channel and the control output of the timer 70 which is also provided as an input to the synchronous detectors 71 and 72.

The output of each synchronous detector is, as is well known to those skilled in the art, the logical product of the associated H or V channel signal with the sense channel output, during the period when the control signal from timer 70 allows the synchronous detecting function to proceed. The output of each synchronous detector 71 and 72 is provided to an associated integrator, the output of synchronous detector 71 provided to an integrator comprising operational amplifiers 80, 81 and 82; the output of operational amplifier 81 comprising the signal POL, and the output of operational amplifier 82 comprising the signal which is the absolute value of the output of operational amplifier 81. Likewise, the output of synchronous detector 72 is coupled to an integrator comprising an operational amplifier 90 and its output is taken at the terminal V.

The summer 19 (of FIG. 1A) is implemented by operational amplifier 85 (in FIG. 2A) with an input terminal which is connected to resistors R1 and R2. Resistor R1 couples the output of operational amplifier 90 (the V channel) and resistor R2 couples the output of the H channel. The resistors R1 and R2 are relatively dimensioned so that the output of operational amplifier 80 is the sum of the V channel signal plus half the H channel signal; and this is termed the R or sum signal.

Figure 3:
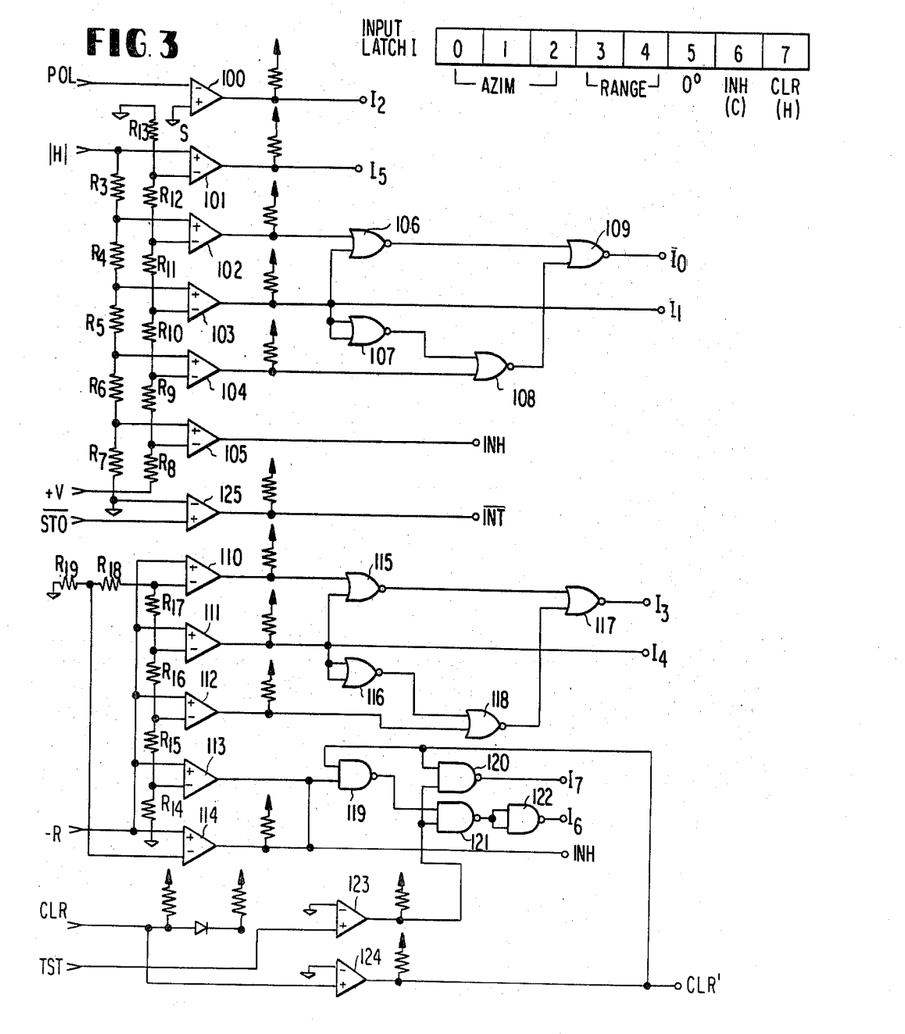
FIG. 3 is a schematic of the analog to digital converters of the block diagram of FIG. 1A.

Referring now to FIG. 3, the analog to digital converters 21 and 22 are illustrated. At the top of FIG. 3 is a representation of the input latch I to the processor 20, showing the meaning of the 8 bit input. As shown at the top of FIG. 3, bits $I_0$ through $I_2$ and $I_5$ designate azimuth, bits $I_3$ and $I_4$ designate range, bit $I_6$ indicates an inhibit condition and bit $I_7$ is a clear command which may be initiated by the operator. The analog-to-digital converter 21, 22 comprise a plurality of comparators and associated logic circuits. The second analog-to-digital convertor, 22 comprises comparators 100 through 105. Each of comparators 101 through 105, receives on one input, the output of the H channel, or a predetermined portion thereof selected via a series of voltage dropping resistors $R_3$–$R_7$. The other input to each of the comparators 101 through 105 is a selective portion of the output of the V channel as determined by another series of voltage dropping resistors $R_8$ through $R_{13}$. The resistors $R_3$ through $R_{13}$ are selected so that in the vicinity of 0° azimuth, $I_5$ is low, and the other azimuth bits $I_0$ through $I_2$ are high. The output of comparator 102 indicates azimuth of approximately more than 22°, the output of comparator 103 indicates azimuth of approximately more than 37.5° and the output of comparator 104 indicates azimuth of approximately more than 52.5°. These outputs are combined via NOR gates 106-109 to provide azimuth indicating output bits $I_0$ and $I_1$. The output of comparator 100, which compares a signal POL (derived in the H channel, but indicating polarity) with a predetermined reference and generates output $I_2$ indicating the azimuth polarity is either positive or negative.

Finally, comparator 105 provides a distinctive output if the polarity is in excess of 67.5°, and this is used to develop the inhibit bit $I_6$, if the azimuth indication is outside the range of the instrument.

The first analog-to-digital converter 21 comprises comparators 110 through 114. Each of these comparators has, as one input, the R channel signal or range approximation signal. The other input to each of these comparators is a different voltage threshold established by voltage dropping resistors R14 through R19. The largest and smallest of these reference voltages are provided as the other input to comparators 113 and 114. Comparator 113 produces an output if range is in excess of 100 nautical miles, and comparator 114 produces an output if range is less than 5 miles. These outputs are tied together and are also used to develop the inhibit bit $I_6$.

Comparators 110 through 112 generate outputs at different range increments. For example, comparator 110 produces an output indicating a range in excess of 15 miles, comparator 111 produces an output indicating a range in excess of 30 miles and comparator 112 produces an output indicating a range in excess of 50 miles. These outputs are coupled to a logic circuit comprising NOR gates 115-118 the output of which comprises the range indicating bits $I_3$ and $I_4$ in accordance with the Table which forms FIG. 1B.

The logic circuit used to generate the bit $I_6$ and $I_7$ comprises NAND Gates 119 through 122, which employs, in addition to the outputs of the comparators, the clear and test inputs which are commands initiated by the observer. These commands generate signals which are coupled through comparators 123,124. Finally, the timer output $\overline{STO}$ is provided as one input to a comparator 125 which has a predetermined reference potential on its other input. In the presence of the signal $\overline{STO}$ (more particularly when that signal goes low) the output of comparator 125 provides the signal $\overline{INT}$ which is used to interrupt processor 20 for the purpose of accepting the contents of the input latch I. When this signal is produced, the H and V signal's integration has been concluded, and the outputs $I_0$ through $I_7$ are ready for processing. It should be noted that since the A/D 21 and 22 are not gated their outputs follow the outputs of the integrators 16 and 17 so that the digital outputs are immediately available as soon as the integration process is terminated.

Figure 4:
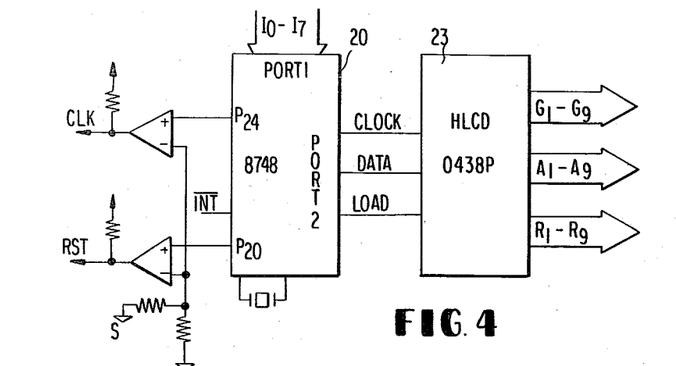
FIG. 4 is a schematic of the processor and display elements of FIG. 1A.
Figure 5:
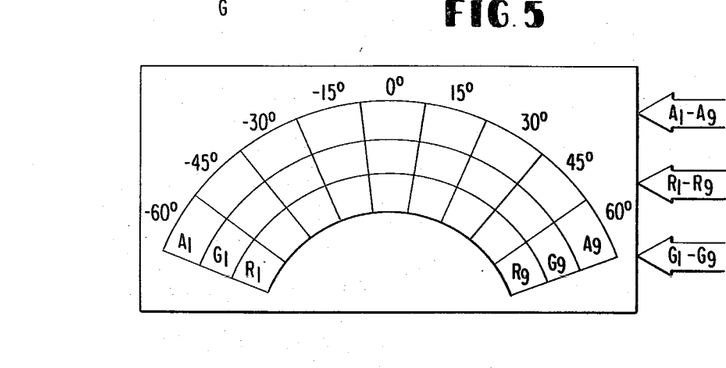
FIG. 5 is an illustration of the display element itself.

FIG. 4 is a schematic of the processor and display chip. As is shown in FIG. 4 the processor, in one embodiment of the invention which has been constructed, comprises an eight bit microprocessor carrying a commercial designation 8748. This microprocessor has a first input port to which is connected the outputs $I_0$ through $I_7$ of the circuitry shown in FIG. 3. A second port of the microprocessor is used as an output port providing clock, data and load signals to the display element or driver which carries the commercial designation HLCD0438P. The display driver produces 27 outputs, G1-G9, A1-A9 and R1-R9, one for each element in the display 24. Two further outputs from the microprocessor 20 are coupled through operational amplifiers and provide the signals CLK and RST, the first is a timing signal employed by the timer 18, and the second is the reset signal which is also provided to the timer 18. FIG. 5 is an illustration of the display element 24 which comprises the twenty-seven element LCD display with an input from the display driver 23; each element in the display has a corresponding drive line input from the display driver 23. As mentioned above, each display element may display one of four different conditions, that is more particularly dark, indicating no activity; steadily illuminated indicating low activity, slowly flashing, indicating increased activity and rapidly flashing, indicating the highest activity. Each display element of the 27 maps to a predetermined geographic region in one of 9 azimuth sectors from +60° to −60°, and one of the three range cells from 5 to 30 miles, from 30-60 miles and 60 to 100 miles. Accordingly, the combination of type of illumination, if any, and location of display elements informs the observer of the intensity and location of detected electrical disturbances.

To illustrate the processing performed by the processor 20, reference is now made to FIGS. 6A-6H which is a flow chart of the processing routine.

FIGS. 6A through 6H illustrate, in flow chart form, pertinent portions of the software employed by the processor 20. Before describing the software it should be noted that the processor 20, in an embodiment that has been constructed provides 63 bytes of user RAM. Thirty-six of these bytes are employed for data storage pertaining to electrical disturbance activity. Nine bytes for each of the four different range segments, too close, close, mid and far. Four registers comprising register bank 1 are used for temporary storage. Sixteen registers are used for a data stack stacking return addresses and other housekeeping information and eight additional registers are employed constituting register bank zero, and of these two are employed for eighteen second timer, one is employed for the display timer and another is employed as a data phase counter. As will be explained, each time activity is detected in a far range cell, the data at the memory location corresponding to that cell is incremented by a first quantity, activity related to the mid-range segment causes the data to be incremented by double the first quantity, activity related to the close range cell results in the data being incremented by four times the first quantity and activity detected in a too close range cell causes the data to be incremented by eight times the first quantity. An embodiment of the invention which has actually been constructed the first quantity was equal to four. Furthermore, as has been mentioned, the quantity in each of the storage locations corresponding to electrical activity is decremented at a rate which is related to the data stored at that memory location. In an embodiment of the invention which has actually been constructed memory locations storing quantities of 16 or less are decremented by one count every 18 seconds, memory locations storing data between 16 and 32, are decremented by 2 counts every 18 seconds and memory locations storing data greater than 32 are decremented by 4 counts, every 18 seconds.

Finally, it has also been pointed out that while the processor 20 maintains the storage location corresponding to each of 36 range cells, the display only provides for 27 segments. This is implemented by summing the data for too close and close range cells in like azimuth sectors and using the sum to drive the display.

Figure 6A:
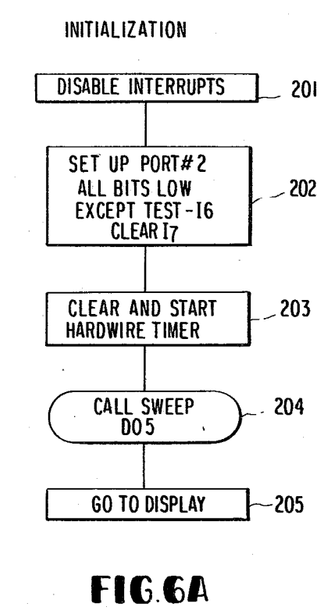
FIG. 6A illustrates an initialization routine.

FIG. 6A illustrates an initialization routine which is performed on power-up or restart. As is shown in FIG. 6A the function 201 disables the interrupts, function 202 sets-up port No. 2 (which is used to drive the display through the display chip 23) by controlling all data bits to zero. Function 203 clears and starts a 34 millisecond hardware timer available in the 8748 and function 204 calls a sub-routine SWEEP. As will become clear when that sub-routine is discussed, it provides for an initial sweep of the display elements 24 by for example, illuminating the three range cells at −60° azimuth, turning those display elements off and illuminating the three range cells for −45° in azimuth and continuing this process until the +60 azimuth range cells are illuminated. Function 204 calls for this SWEEP to be effected five times. At the conclusion of that operation, function 205 directs the processor to the display sub-routine. Prior to discussing this display sub-routine, however, reference is made to FIGS. 6E and 6F which illustrate the interrupt handler. It should be clear by now, that when data is available from the circuitry of FIGS. 2 and 3, processor 20 is interrupted, and the functions shown in FIGS. 6E and 6F are performed, once for each interrupt. In the absence of interrupts, the processor 20 is occupied mainly in the display routine for control of the display chip 23, but periodically that routine causes an integration routine to be performed to decrement the quantity stored in memory locations relating to electrical disturbance activity.

However, both these processes are temporarily halted on the occasion of an interrupt.

As shown in FIG. 6E functions 206 and 207 select an interrupt register bank and read the data provided on conductors $I_0$ through $I_7$ into a register. Functions 208 through 211 examines bit $I_7$ (which relates to operator commanded CLEAR operations), since the clear function is not pertinent to the invention it will not be explained further. Function 212 examines bit 6, which is a "1" if the circuitry of FIG. 3 has detected an inhibit condition (out of range data). Assuming that bit 6 is "0" then bit 5 is examined (identifying whether or not the azimuth sector to be addressed is the 0° sector). Assuming it is not "0" then the 0° azimuth sector is not indicated and function 215 is performed to create an index; if bit 5 was "0" then function 214 is performed to create a special 0° pre-index. The input data, with range bits $I_3$ and $I_4$, and azimuth bits $I_0$ to $I_2$ can be used as a relative address into the data memory by masking the most significant three bits; $I_5$–$I_7$. Function 215 performs this function. The 0° data requires an additional shift, prior to function 215, and function 214 effects this additional shift. Memory registers which maintain data corresponding to electrical activity are all addressed by the interrupt register in a relative fashion. Thus, function 216 adds the base value to the index to provide absolute addresses. Function 217 clears a register which will be used in further processing. Function 218 looks at the range bits, that is, bits 3 and 4; this is implemented by appropriately masking the interrupt register. Functions 220 through 222 then determine which range cell is being addressed by the two bits being examined. Depending on which range cell has been determined active, functions 223,224; 225,226; 227,228 or 229 and 230 are performed (see FIG. 6F for functions 225-234). These functions obtain an appropriate value, i.e., those specified in FIGS. 6E and 6F depending upon the range cell and add that value to the register which had been cleared at function 217. Function 231 then obtains the data from the addressed memory location corresponding to the range and azimuth stored in the interrupt register, and adds the pre-existing data to the quantity in the register. At this point, the memory location, although having been read, is undisturbed. Function 232 then determines whether or not the sum in the register indicates an overflow condition (that is, it is greater than 255). If it is, the value stored at the memory location is not altered. However, if it is not an overflow, then function 233 writes the value from the register to the associated memory location. In either event, function 234 outputs a reset pulse which is coupled, from the processor to the timer 70.

The specific arrangement of functions 223-230 performs the function of adding the appropriate (range determined) quantity to the pre-existing data in a very program efficient manner. The reader can verify that, for example, ½ the "too close" quantity (16) plus ½ the "close" quantity (8) plus ½ the "mid" quantity (4) plus the "far" quantity (4) equals 32 or the "too close" quantity. Of course the same effect could be obtained (in slightly more program space) by a different add and return instruction for each of the different range segments.

The foregoing processing, is omitted in the event that function 212 determines that inhibit conditions exist, and if that is the case, function 213 through 233 are omitted and only function 234 is performed to reset the timer. Thus, under inhibit conditions the new data is ignored.

From the foregoing it should be apparent that the processor 20 maintains a memory location with a data value stored therein which represents electrical activity in a geographic area corresponding to that memory location; and the area covered by the instrument (5 to 100 nautical miles in range, ±60° in azimuth) is handled by 36 different cells; the data stored in each location (from 0 to 255) indicates the relative activity at that location. By relative activity is meant not only the number of times an electrical disturbance is detected and which is determined to originate at that location but also to bias the display so that relatively closer disturbances (in a smaller sector) are given higher activity values than further activity (in a larger sector). Thus, each time an electrical disturbance is detected, a predetermined quantity is added to the data in the corresponding memory location, but the predetermined quantities are different depending on the range parameters associated with the memory cell.

Figure 6B:
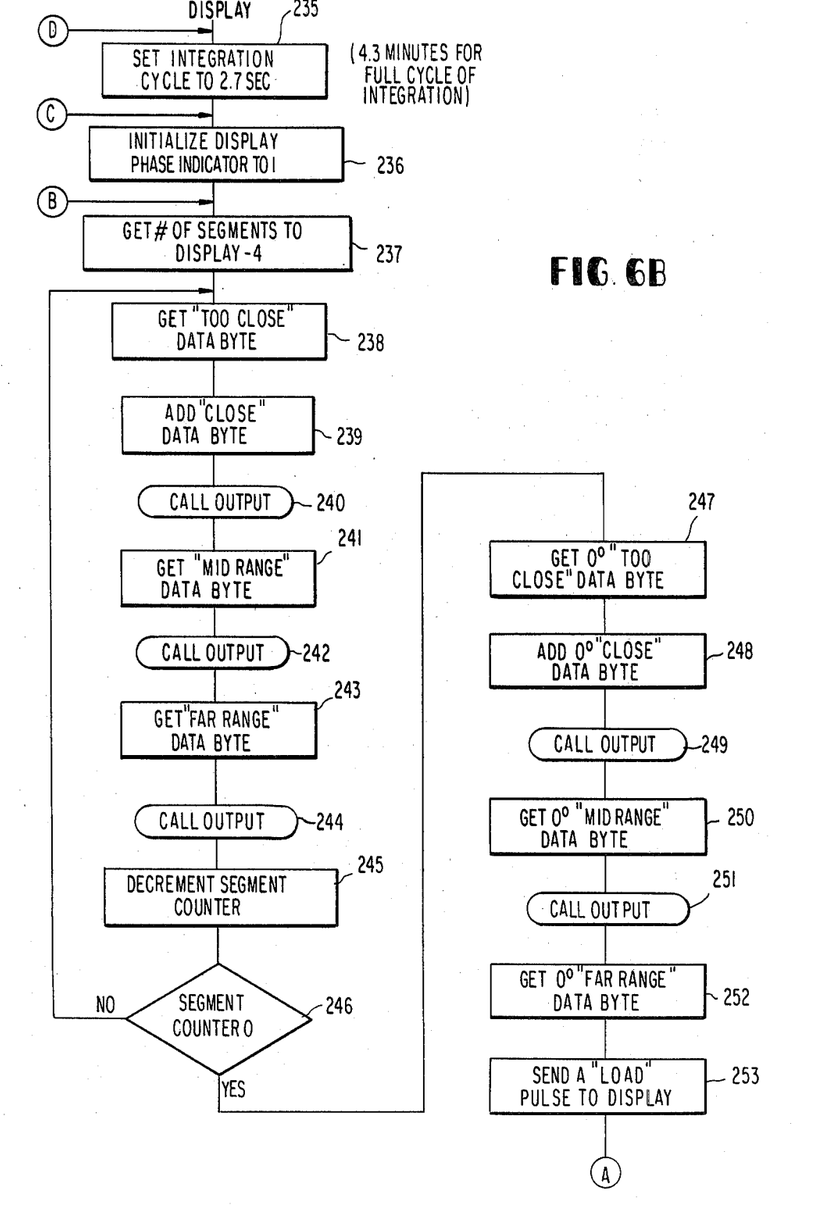
FIGS. 6B and 6C illustrate the display routine.
Figure 6C:
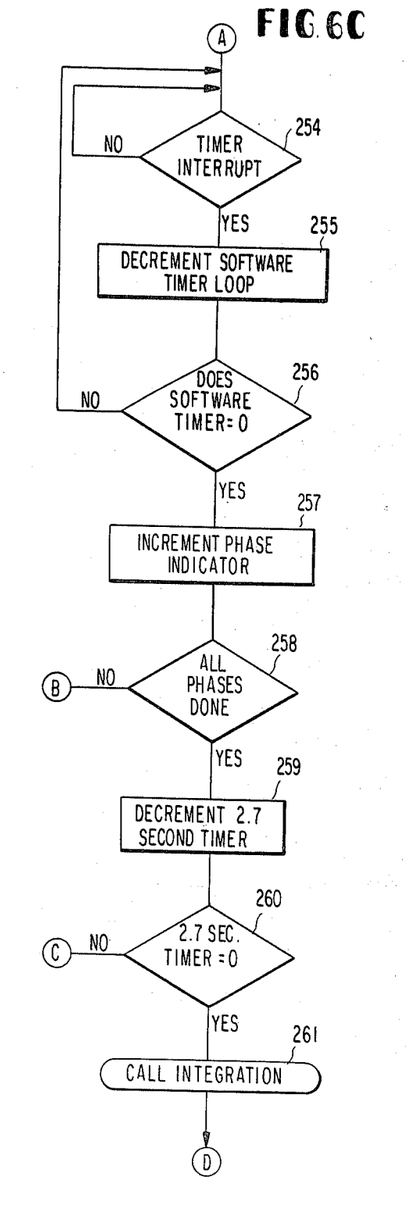
Figure 6D:
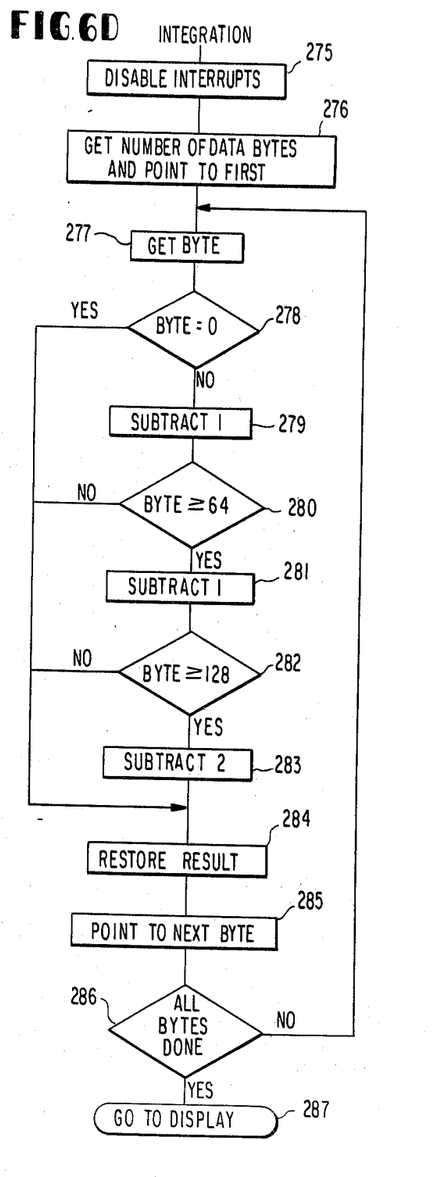
FIG. 6D illustrates the integration routine.
Figure 6E:
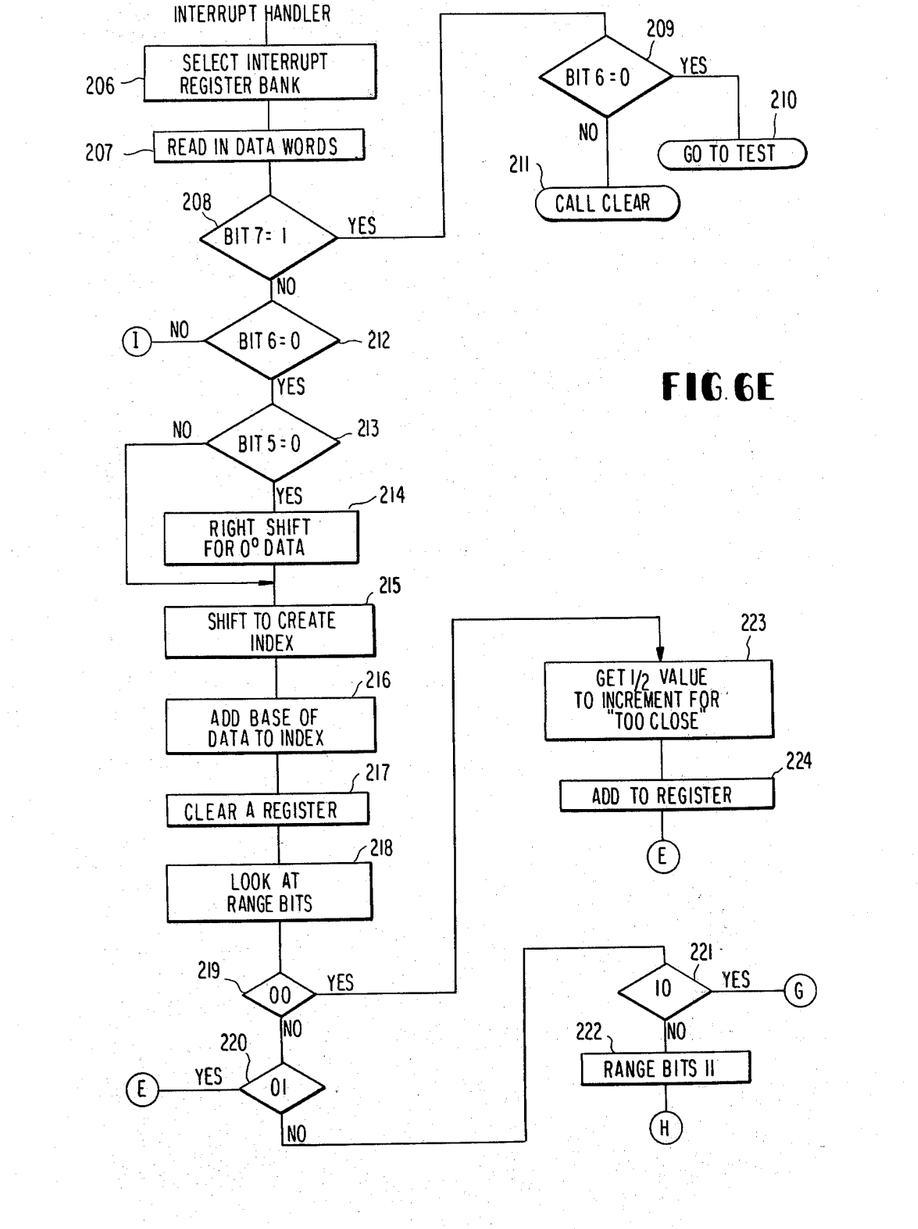
FIGS. 6E and 6F illustrate the interrupt handler.
Figure 6F:
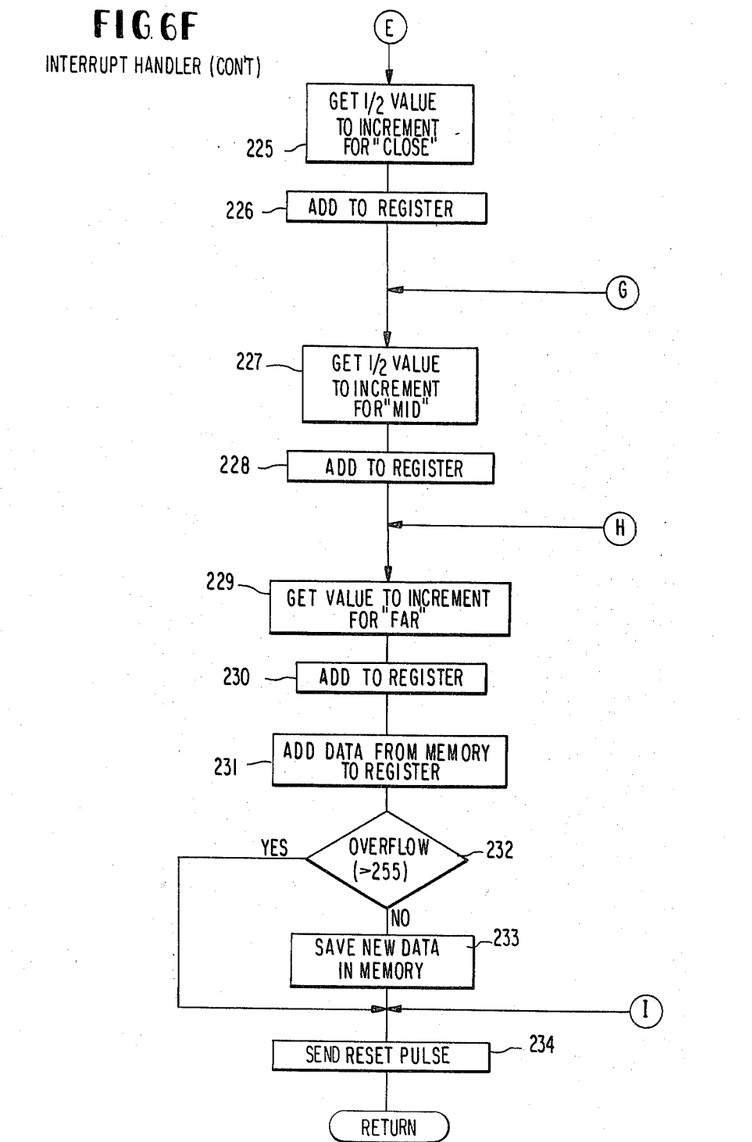

FIGS. 6B and 6C illustrate the display routine, which occupies a majority of the processors time.

Figure 6G:
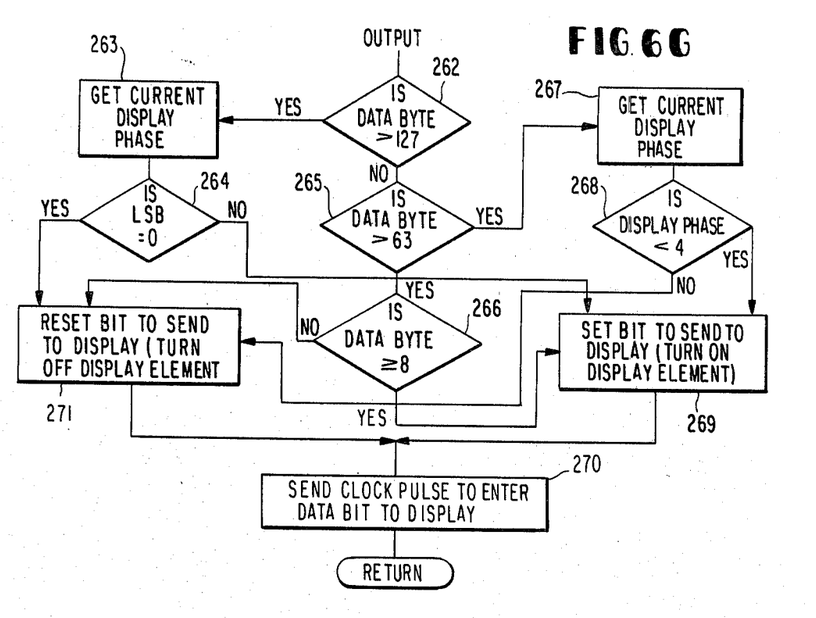
FIG. 6G illustrates the output routine and FIG. 6H illustrates the sweep routine.

As shown in FIG. 6B when the display routine is entered an integration cycle is set to 2.7 seconds. Actually, this is merely setting and initiating a timer. Function 236 initializes the display phase indicator to one, this corresponds to setting a particular register to this quantity. As this description proceeds note that there are four different display phases. Function 237 obtains a number equal to the number of segments to display less four. The number of segments to display is obtained from the index created during the interrupt handling process, and the reason the number four is subtracted therefrom will become clear as this description proceeds. Function 238 gets a "too close" data byte and function 239 obtains the "close" data byte in the same azimuth sector and sums the two. With this quantity, function 240 calls the output routine. As shown in FIG. 6G, function 262 determines if the data byte is more than 63, and if it is not, function 266 determines if the data byte is more than or equal to 8. Assuming that the data byte is greater than 127 function 263 gets the current display phase (in the range 1-4). Function 264 examines the least significant bit of the display phase. If it is zero, function 271 is performed to reset a bit to send to the display chip; this corresponds to turning off that display segment. Function 271 is also performed if the data byte is less than 8 in other words segments with data bytes of less than 8 are not displayed. If, on the other hand, the data byte is between 63 and 127 then function 267 gets the current display phase and function 268 determines if that phase is less than 4. If the display phase is not less than four, and the data byte is between 63 and 127, function 271 is performed, i.e., data bytes between 63 and 127 are not displayed in phase 4. On the other hand, if the display phase is equal four, and the data byte is between 63 and 127, or if the data byte is between 8 and 63, or if the least significant bit as determined in function 264 is not 0, then function 269 is performed to set the bit to send to the display chip (corresponding to turning on a display segment). Function 270 then sends a clock pulse to enter the data bit to the display chip. That concludes the output routine. Accordingly, it should be apparent that a bit corresponding to the display segment for the memory location being operated on is either set or reset depending upon the conditions determined by the functions shown in FIG. 6G. We now return to FIG. 6B and pick up at function 241. Functions 241,242 and 243,244 perform a similar operation for the mid-range and far range cells (except, of course, that there is no summing operation involved). Accordingly, each provides for outputting appropriate data to the display chip depending on the current contents of the associated memory location. Function 245 then decrements the segment counter. Function 246 then examines the segment counter, and if it is not "0" then the routine loops back to pick up more memory locations for display purposes. If the segment counter on the other hand, is zero, then a similar operation is performed via functions 247 through 252 for each of the 0° azimuth sectors. At the conclusion of function 252, data bits in the display chip have all been set or reset, as appropriate and function 253 sends a "load" pulse to the display to make that information effective. The remaining portions of the display routine are shown in FIG. 6C where function 254 determines whether or not a 34 millisecond timer has provided an interrupt, and if it has not the routine is maintained at this point until such interrupt occurs. Function 255 then decrements a 170 millisecond software timer loop. Function 256 determines if the software loop has been decremented to 0.

If it has not, then the routine is maintained looping between functions 254 and 256 until it does. At that point, function 257 increments the phase indicator and function 258 determines if all phases have been completed. Four valid phase indicators are used. If they have not, the routine loops back to function 237 where the preceding functions are repeated. These functions are repeated until function 258 determines that all phases are completed. Function 259 then decrements the 2.7 second timer. Function 260 determines if the timer has been decremented to 0. If it has not, the routine loops back in the display routine to function 236 to again initialize the display phase indicator to 1, and repeat the preceding functions. Accordingly, the display may go through multiple phases within the period of the 2.7 second integration cycle. However, when function 260 determines that the 2.7 second timer has expired, then function 261 calls the integration routine. Reference to FIG. 6B illustrates a flow chart of that routine. When the integration routine is entered, function 275 disables all interrupts. This ensures that the routine is completed without interruption. Function 276 gets the number of data bytes and points to the first byte; this is effected again by reference to the index created in the interrupt routine. Function 277 gets the first byte and function 278 determines if it is equal to "0". If it is not, function 279 decrements it by the count of "1". Function 280 determines if the byte is 64 or greater. If it is, function 281 subtracts an additional unity amount from that quantity and function 282 determines if the byte is greater than or equal to 128. If it is, then function 283 subtracts an additional quantity of 2. If, on the other hand, function 282 determines that the byte is not 128 or greater then function 283 is not performed. Likewise, if function 280 determines that the byte is 63 or less, then functions 281 through 283 are not performed and, if function 278 determines that the byte is equal to 0, then functions 279 through 283 are not performed. In either event, function 284 takes the result of the foregoing process and restores it in the memory location from which it was obtained. Function 285 increments the pointer so as to point to the next byte and function 286 determines if all bytes have been completed, and if not, the routine loops back to function 277 where functions 277 through 285 are performed until function 286 indicates that all bytes are completed. At that point, function 287 returns to the display routine at function 235 to again reinitialize the 2.7 second integration cycle.

From the foregoing it should be appreciated that while the interrupt handler serves to increment the quantities in the various memory locations depending on detected activity, the integration routine serves to decrement the quantity and while the decrementation is handled sequentially for each data byte or memory location, the amount subtracted from each memory location depends on the quantity stored therein. As a result, the information in any memory location or data byte is a mix of information corresponding to range from the observation location and detected activity time biased to emphasize most recent data. At 2.7 seconds per integration cycle it takes a little over 4 minutes for a memory location which had previously stored the maximum quantity (255) to be decremented to 0.

From the preceding it should also be apparent how the flashing function is effected. Referring again to FIG. 6G, for data bytes greater than 127 (intense activity), function 264 sets and resets the corresponding bit for each change in display phase. On the other hand, for data bytes between 64 and 127 (less intense), function 268 requires the passage of at least four display phases before setting or resetting each corresponding bit; and for data bytes of 8 to 63, function 266 ensures that the bit is maintained set (minimum displayable activity); data bytes of 7 or less are not illuminated at all.

Figure 6H:
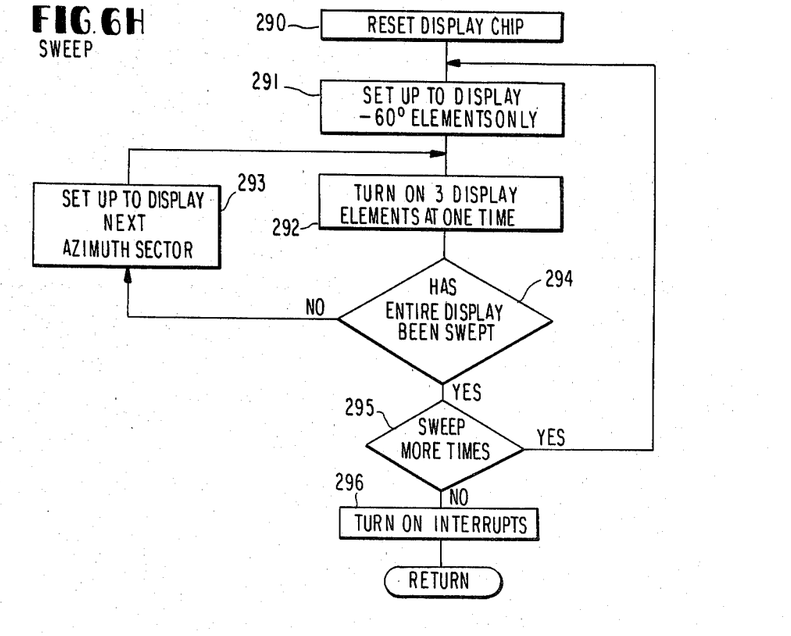

FIG. 6H illustrates the sweep routine; since its operation should be apparent at this point no further description is believed necessary.

While the preceding has described a specific preferred embodiment of the invention, it should be apparent that many changes can be made therein within the spirit and scope of the invention and accordingly, the scope of the invention is to be judged by the attached claims. It is worthy of note, however, that the different amounts by which the various memory locations are incremented or decremented is not essential to the invention nor is the number of display segments, the number of memory locations used for data storage or the range limitations imposed on the instrument; all these can be changed to suit particular needs. For example, each time activity is detected, all cells could be imcremented by a like amount, or a different ratio used for incrementing different range cells. Likewise, it is not essential to the invention to employ an LCD display nor to use the particular convention employed to denote various levels of activity (rather than flashing at different rates or steady illumination, different displays for example with neon bulbs could be used).

What is claimed is:

1. A system for detecting and displaying relative geographic locations of sources of electrical disturbances generated by weather phenomena with respect to an observation location comprising:
   receiving means for receiving electrical signals generated by said electrical disturbances in a predetermined frequency band and for producing received signals related thereto,
   timing means responsive to said received signals for producing a plurality of control signals,
   processing means responsive to said received signals and to said control signals for producing processed signals identifying said geographic locations relative to said observation location, said processed signals relating said received signals relative to an origin of a frame of reference corresponding to said observation location whereby relatively larger received signals are related closer to said origin of said frame of reference than relatively smaller received signals,
   logic means, including storage means, with plural storage locations, responsive to said control signals and to said processed signals for storing data representing any particular processed signal at one of said storage locations determined by one of said geographic locations corresponding to said any particular processed signal and
   display means driven by said logic means for displaying said stored data representing relative locations of said electrical disturbances to said frame of reference.

2. The apparatus of claim 1 wherein said logic means maintains a separate storage location for each of a number of discrete locations of said display means, each said storage location addressed by said processed signals and wherein said logic means sums a determined quantity with pre-existing contents of a storage location identified by each processed signal and restores said sum to said storage location.

3. The apparatus of claim 2 in which said logic means includes plural groups of separate storage locations, each said group associated with a different determined quantity.

4. The apparatus of claim 2 in which said logic means includes decrementing means for decrementing data in each said storage location in sequential order.

5. The apparatus of claim 4 in which each storage location is decremented at a rate related to the data stored therein.

6. The apparatus of claim 1 wherein said receiving means includes,
   a sense channel and a pair of magnetic channels producing sense and first and second magnetic received signals, and wherein said processing means includes,
   first and second correlating means for said magnetic channels for correlating said magnetic received signals with said sense received signal,
   first and second integrators responsive to said correlating means for producing first and second integrated correlated signals,
   summing means responsive to said first and second integrators for producing a sum signal, and
   first digital converter means for producing a processed signal comprising a digital representation of said sum signal in said frame of reference whereby a larger sum signal generates a smaller digital signal.

7. The apparatus of claim 6 in which said processing means includes:
   second digital converting means responsive to said first and second integrators for producing a processed signal comprising a digital representation of azimuth in said frame of reference.

8. The apparatus of claim 7 in which said logic means addresses its storage means with said digital representations of said sum signal and azimuth representing digital signal.

9. The apparatus of claim 6 in which said first digital converting means includes a plurality of comparators each with a pair of inputs and an output, a one of said comparator inputs comprising said sum signal and each of said comparators having a different reference pootential as a second input,
   and a logic circuit with an input from each of said comparators and a three bit output, two bits of said three bit output representing said digital representation of said sum signal in said frame of reference and a third bit representing a sum signal beyond the range of said system.

10. The apparatus of claim 6 in which said sum signal comprises the sum of said first integrated correlated signal and one-half said second integrated correlated signal.

11. The apparatus of claim 3 in which said logic means maintains a plurality of groups of storage locations, each group of locations associated with a different determined quantity, and in which said display means contains a second plurality of groups of display segments wherein said second plurality is less than said first plurality.

12. The apparatus of claim 11 in which each said display segment has a corresponding storage location and one of said groups of display segments is associated with two groups of storage locations.

13. The apparatus of claim 11 in which said first plurality is 4 and said second plurality is 3.

* * * * *